United States Patent
Kikuchi (10) Patent No.: US 8,946,575 B2
(45) Date of Patent: Feb. 3, 2015

(54) PUSH-BUTTON SWITCH STRUCTURE AND ELECTRONIC DEVICE HAVING SAME

(75) Inventor: Genkei Kikuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 238 days.

(21) Appl. No.: 13/583,190

(22) PCT Filed: Jul. 6, 2011

(86) PCT No.: PCT/JP2011/003877
§ 371 (c)(1),
(2), (4) Date: Sep. 6, 2012

(87) PCT Pub. No.: WO2012/011236
PCT Pub. Date: Jan. 26, 2012

(65) Prior Publication Data
US 2012/0325637 A1    Dec. 27, 2012

(30) Foreign Application Priority Data
Jul. 23, 2010   (JP) ................. 2010-165745

(51) Int. Cl.
| | |
|---|---|
| H01H 13/06 | (2006.01) |
| H01H 13/14 | (2006.01) |
| H04M 1/23 | (2006.01) |
| H04M 1/02 | (2006.01) |

(52) U.S. Cl.
CPC ............ *H01H 13/063* (2013.01); *H01H 13/14* (2013.01); *H04M 1/236* (2013.01); *H01H 2223/002* (2013.01); *H04M 1/0214* (2013.01); *H01H 2229/048* (2013.01)
USPC ....................................... 200/302.2; 200/341

(58) Field of Classification Search
CPC ..................... H01H 13/06; H01H 2223/002
USPC .................................................. 200/302.2
See application file for complete search history.

(56) References Cited

U.S. PATENT DOCUMENTS

| | | | |
|---|---|---|---|
| 5,626,222 A * | 5/1997 | Aguilera ................. | 200/305 |
| 2003/0174590 A1 | 9/2003 | Arikawa et al. | |
| 2007/0034493 A1 | 2/2007 | Kawasaki et al. | |

FOREIGN PATENT DOCUMENTS

| | | |
|---|---|---|
| CN | 1881498 A | 12/2006 |
| CN | 101399127 A | 4/2009 |
| JP | 2002-352662 A | 12/2002 |
| JP | 2003-331684 A | 11/2003 |
| JP | 2006-19112 A | 1/2006 |

OTHER PUBLICATIONS

International Search Report issued in PCT/JP2011/003877, dated Aug. 30, 2011.

* cited by examiner

*Primary Examiner* — Renee Luebke
*Assistant Examiner* — Ahmed Saeed
(74) *Attorney, Agent, or Firm* — Birch, Stewart, Kolasch & Birch, LLP (57) ABSTRACT

A switch through hole 22 is formed in a front cabinet 5a, and a press switch 21 is located in the front cabinet 5a to correspond to the switch through hole 22. With a pressing element 25 inserted in a plate through hole 28a of a reinforcing plate 28, an outer periphery of a middle portion of the pressing element 25 in an axial direction and the plate through hole 28a are connected by a silicone rubber 27. A key top 26 is coupled to one end of the pressing element 25 in the axial direction so as to be exposed from the switch through hole 22, and a switch assembly 24 is fitted in the switch through hole 22. This structure increases durability of a push-button switch, while increasing ease of assembly of a push-button switch structure.

9 Claims, 11 Drawing Sheets

PUSH-BUTTON SWITCH STRUCTURE AND ELECTRONIC DEVICE HAVING SAME

TECHNICAL FIELD

The present invention relates to push-button switch structures used in electronic devices, such as a mobile phone, and electronic devices having the push-button switch structures.

BACKGROUND ART

Push-button structures which include a fixed structure portion and an operation body attached to the fixed structure portion so as to be able to protrude and retract with respect to the fixed structure portion have been known. The operation body is provided with a sliding portion configured to be slidable with respect to the fixed structure portion, and an operation head connected to the outside of the sliding portion and having a larger diameter than the sliding portion to overhang the sliding portion.

For example, in Patent Document 1, an elastic member which has a cylindrical shape surrounding the sliding portion and which is capable of being elastically deformed is held between the overhang portion of the operation head and the fixed structure portion. The elastic member has a first contact portion that is in contact with the inner surface of the overhang portion of the operation head, a second contact portion that is in contact with a portion of the fixed structure portion which faces the overhang portion, and a third contact portion that is in contact with the sliding portion.

CITATION LIST

Patent Document

Patent Document 1: Japanese Patent Publication No. 2002-352662 (page 14, FIG. 6)

SUMMARY OF THE INVENTION

Technical Problem

However, assembly of the push-button switch structure of Patent Document 1 is not easy because the elastic member and the operation body are separate members. Moreover, the thickness of the elastic member needs to be reduced in order to ensure operability of the operation body. If the thickness of the elastic member is reduced, the elastic member is extensively compressed every time the operation body is operated. Thus, the elastic member tends to be degraded, and in some cases, the elastic member is broken, resulting in reduction in waterproof performance.

The present invention was made in view of the above problems, and it is an objective of the invention to increase durability of a push-button switch while increasing ease of assembly of a push-button switch structure.

Solution to the Problem

To achieve the above objective, an elastic member is connected to a middle portion of a pressing element in the present invention.

Specifically, the first aspect of the present invention is directed to a push-button switch structure of an electronic device. The push-button switch structure includes: a switch through hole formed in an electronic device body; a press switch located in the electronic device body to correspond to the switch through hole; a pressing element whose one end in an axial direction presses the press switch; a key top coupled to the other end of the pressing element in the axial direction, and exposed from the switch through hole; a reinforcing plate having a plate through hole in which the pressing element is inserted; and an elastic member fitted to a periphery of the switch through hole, while connecting an outer periphery of a middle portion of the pressing element in the axial direction and the plate through hole.

In this structure, the elastic member is not compressed but is bent when the pressing element is pressed, because the elastic member is connected to the outer periphery of a middle portion of the pressing element in the axial direction. Thus, even if the thickness of the elastic member is increased, the operability is not significantly reduced. This means that the durability is increased while maintaining the operability, and as a result, dustproof and waterproof effects are increased. Further, the reinforcing plate embedded in the elastic member can increase the durability of the elastic member while preventing the deformation of the elastic member. Further, by adjusting the thickness of the portion at which the elastic member is connected to the outer periphery of the middle portion of the pressing element in the axial direction, it is possible to easily adjust the feel of pressing the pressing element and the elastic force of the pressing element. Further, since the key top and the pressing element are separate members, the shapes of the key top and the pressing element are simpler, and thus the manufacturing time is reduced, compared to the case where the key top and the pressing element are a single-piece member. The design can also be easily changed by simply replacing the key top with another member. In this structure, the pressing element, the reinforcing member, and the elastic member may be used as common components, and the key top may be changed according to electronic devices, thereby making it possible to reduce the fabrication cost. Further, by forming the key top using a metal which is highly durable, and forming the pressing element using a resin which is softer than a metal, it is possible to easily connect the elastic member and the pressing element, and easily remove the elastic member from a metal mold, when forming the elastic member. Moreover, both of the key top and the press switch are not easily damaged.

According to the second aspect of the present invention, in the first aspect of the present invention, a switch recess to which the elastic member is fitted is formed at the periphery of the switch through hole; an elastic-member fitting recess which surrounds the switch through hole is formed in a bottom surface of the switch recess; and an elastic-member annular recess is formed in the elastic member at a position corresponding to the elastic-member fitting recess, so as to cover an inside wall surface of the elastic-member fitting recess and an inner peripheral wall surface of the switch through hole.

In the above structure, when the pressing element to which the key top is coupled is fitted to the switch through hole together with the elastic member, the elastic-member annular recess of the elastic member is elastically deformed to cover the inside wall surface of the elastic-member fitting recess and the inner peripheral wall surface of the switch through hole. Thus, dustproof and waterproof effects are increased.

According to the third aspect of the present invention, in the second aspect of the present invention, the reinforcing plate has an annular vertical wall portion formed at a periphery of the plate through hole and bent toward the press switch; and the elastic-member annular recess is pressed against the inside wall surface of the elastic-member fitting recess and the inner peripheral wall surface of the switch through hole by a corner portion formed by the vertical wall portion and the periphery of the plate through hole.

In the above structure, when the elastic member is attached to the switch through hole, the elastic-member annular recess is effectively pressed against the elastic-member fitting recess by the reinforcing plate embedded in the elastic member to be elastically deformed. Thus, dustproof and waterproof effects are further increased.

According to the fourth aspect of the present invention, in the third aspect of the present invention, a latch recess is formed in a portion of the inner peripheral wall surface of the switch through hole near the press switch so as to be recessed with respect to a portion of the inner peripheral wall surface of the switch through hole near the key top.

In the above structure, the elastic member is pushed into the latch recess by the reinforcing plate. Thus, the elastic member is latched by the latch recess, and is prevented from being separated from the switch through hole with reliability.

According to the fifth aspect of the present invention, in any one of the first to fourth aspects of the present invention, a connecting recess is formed in the outer periphery of the middle portion of the pressing element in the axial direction, and the connecting recess is filled with the elastic member.

In the above structure, the bonding area between the elastic member and the pressing element is increased, and the elastic member is reliably caught into the connecting recess. Thus, durability, as well as dustproof and waterproof effects are increased.

According to the sixth aspect of the present invention, in any one of the first to fifth aspects of the present invention, the pressing element and the reinforcing plate are integrally molded with the elastic member.

In the above structure, the pressing element, the reinforcing plate, and the elastic member are integrally molded beforehand. This makes the positioning easy, and increases ease of assembly. The durability is also increased because the elastic member is reliably connected to the pressing element and the reinforcing plate. Further, by for example, forming the key top using a metal, and forming the pressing element using a resin, the elastic member can be easily connected to the pressing element, and the elastic member can be easily removed from a metal mold, when the elastic member is integrally molded, because, in general, the elastic member is more easily connected to a resin than to a metal.

According to the seventh aspect of the present invention, in any one of the first to sixth aspects of the present invention, the one end of the pressing element in the axial direction is not covered by the elastic member, and the pressing element directly presses the press switch.

In the above structure, one end of the pressing element in the axial direction is not covered by the elastic member. Thus, it is possible to reduce the length of the pressing element in the entire push-button switch structure in the axial direction, and reduce the size of the electronic device.

According to the eighth aspect of the present invention, in any one of the first to sixth aspects of the present invention, the one end of the pressing element in the axial direction is covered by the elastic member, and the elastic member presses the press switch.

In the above structure, the press switch is not easily damaged because the elastic member presses the press switch. As a result, durability can be increased.

According to the ninth aspect of the present invention, in any one of the first to eighth aspects of the present invention, at least part of the electronic device body is covered by an external cover which has an external fitting through hole at a position corresponding to the switch through hole of the electronic device body, and the key top has a flange which contacts a backside periphery of the external fitting through hole.

In the above structure, the flange of the key top prevents the key top from being separated from the electronic device body, and appearance is improved because the external cover blocks the elastic member from view.

An electronic device according to the tenth aspect of the present invention includes the push-button switch structure of any one of the first to ninth aspects of the present invention.

In the above structure, it is possible to provide a highly durable push-button switch structure which is easily assembled and highly marketable.

Advantages of the Invention

As described above, according to the present invention, an outer periphery of a middle portion of a pressing element in an axial direction of the pressing element and a plate through hole are connected by an elastic member, and at least part of a periphery of a switch through hole is covered by a reinforcing plate. Thus, it is possible to increase durability of a push-button switch, while increasing ease of assembly of a push-button switch structure.

According to this structure, it is possible to provide an electronic device which can be easily assembled, highly durable, and highly marketable.

BRIEF DESCRIPTION OF THE DRAWINGS

FIG. 6(a) is viewed from a key top side, and FIG. 6(b) is viewed from a silicone rubber side.

FIG. 7(a) is a side view. FIG. 7(b) is a bottom view.

DESCRIPTION OF EMBODIMENTS

Embodiments of the present invention will be described below based on the drawings.

—Push-Button Switch Structure—

Figure 2:
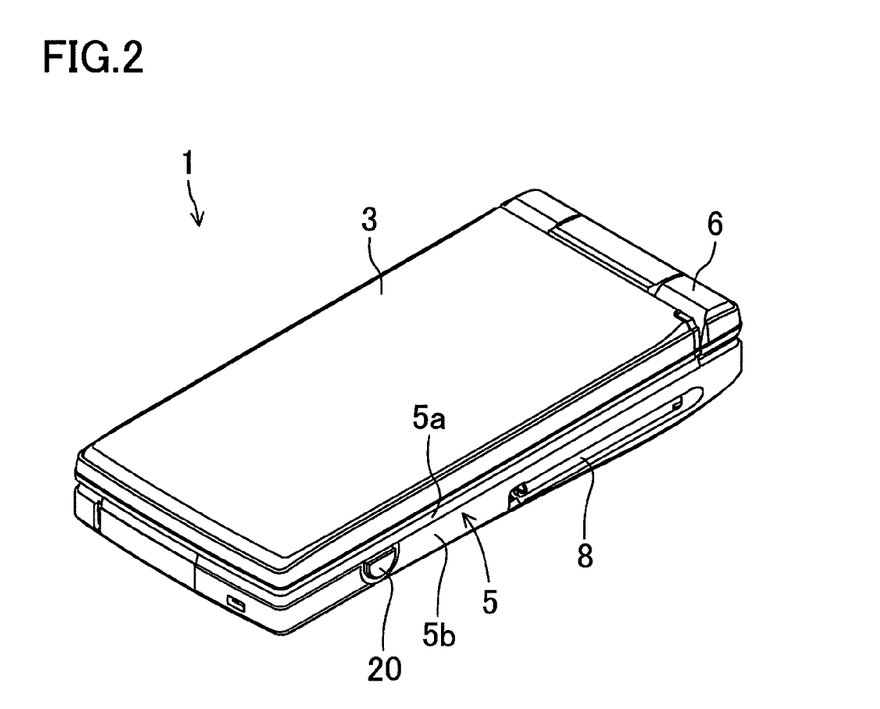
FIG. 2 is an oblique view of a mobile phone in a closed state.
Figure 3:
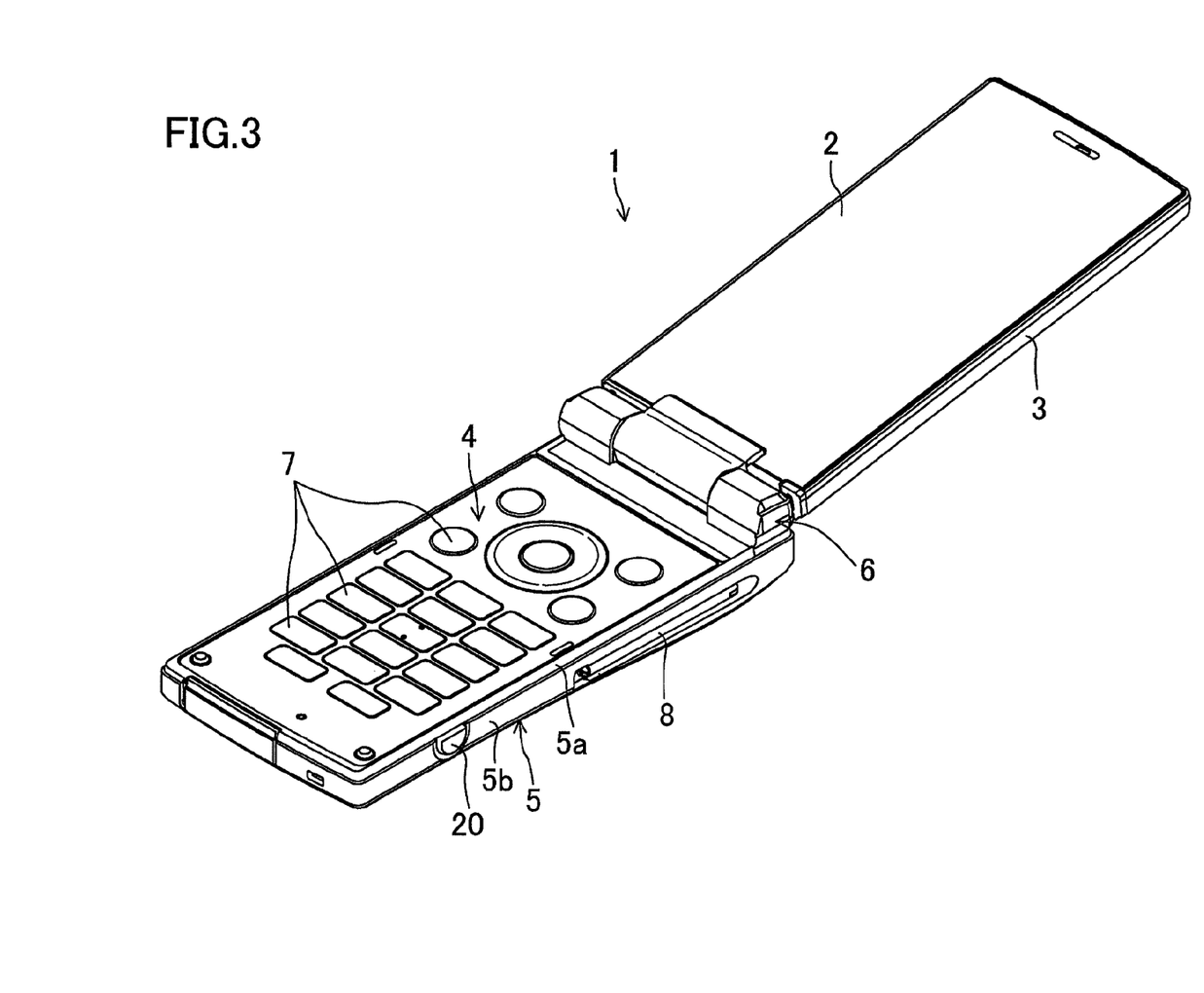
FIG. 3 is an oblique view of a mobile phone in an open state.

FIG. 2 and FIG. 3 show a mobile phone 1 as an electronic device having a push-button switch structure according to an embodiment of the present invention. For example, the mobile phone 1 has a first casing 3 including a display portion 2, and a second casing 5 including an operation portion 4, which are connected to each other such that the mobile phone 1 can be folded and unfolded at a hinge portion 6. The first casing 3 is configured to be able to be reversibly rotated about a vertical axis (not shown) of the hinge portion 6.

A plurality of operation buttons 7 including a numeric keypad are arranged at the operation portion 4 of the second casing 5. A side key 20 as a push-button switch structure is provided at a side surface of the second casing 5. An extendable antenna 8 is housed in the side surface of the second casing 5 at a position closer to the hinge portion 6. The side key 20 functions as a shutter of a camera (not shown) built in the mobile phone 1 (the function includes pressing halfway), as a switch for spotlight (not shown), as a switch for starting the camera when the mobile phone 1 is in the open state, and as a switch for displaying an idle screen from a standby mode when the display portion 2 is facing outside in the folded state, etc.

Figure 5:
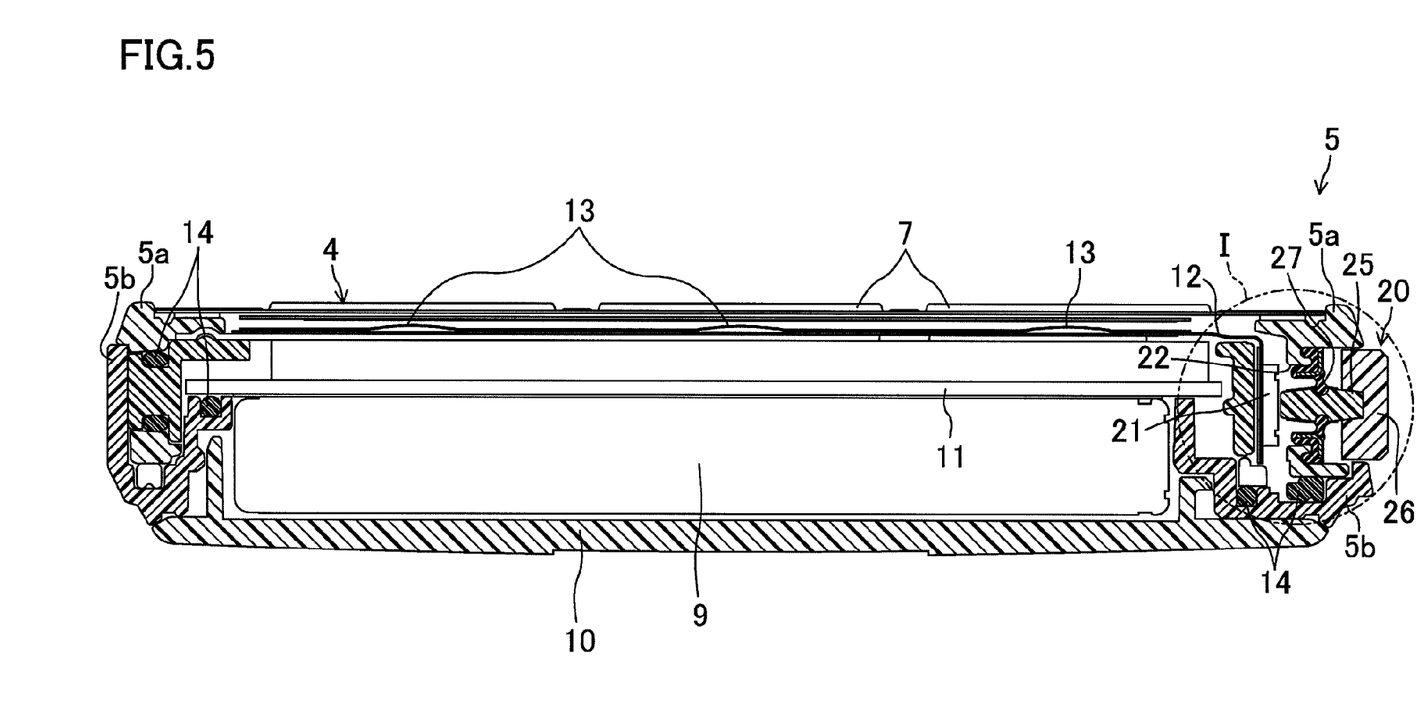
FIG. 5 is an enlarged cross section taken along the line V-V of FIG. 4.

As shown in FIG. 5, the second casing 5 includes a front cabinet 5a as an electronic device body, and a rear cabinet 5b as an external cover which covers a backside of the front cabinet 5a and accommodates a rechargeable battery 9, and to which a battery lid 10 for covering the rechargeable battery 9 is provided. The front cabinet 5a and the rear cabinet 5b are provided with a main substrate 11 which forms the operation portion 4, and a flexible substrate 12 which covers the surface of the main substrate 11. A plurality of dome-shaped switches 13 are provided on the flexible substrate 12. The operation buttons 7 are exposed on the front cabinet 5a, corresponding to the dome-shaped switches 13. Since the mobile phone 1 according to the present embodiment has a waterproof function, a plurality of waterproof sealing members 14 are provided in the second casing 5.

Figure 1:
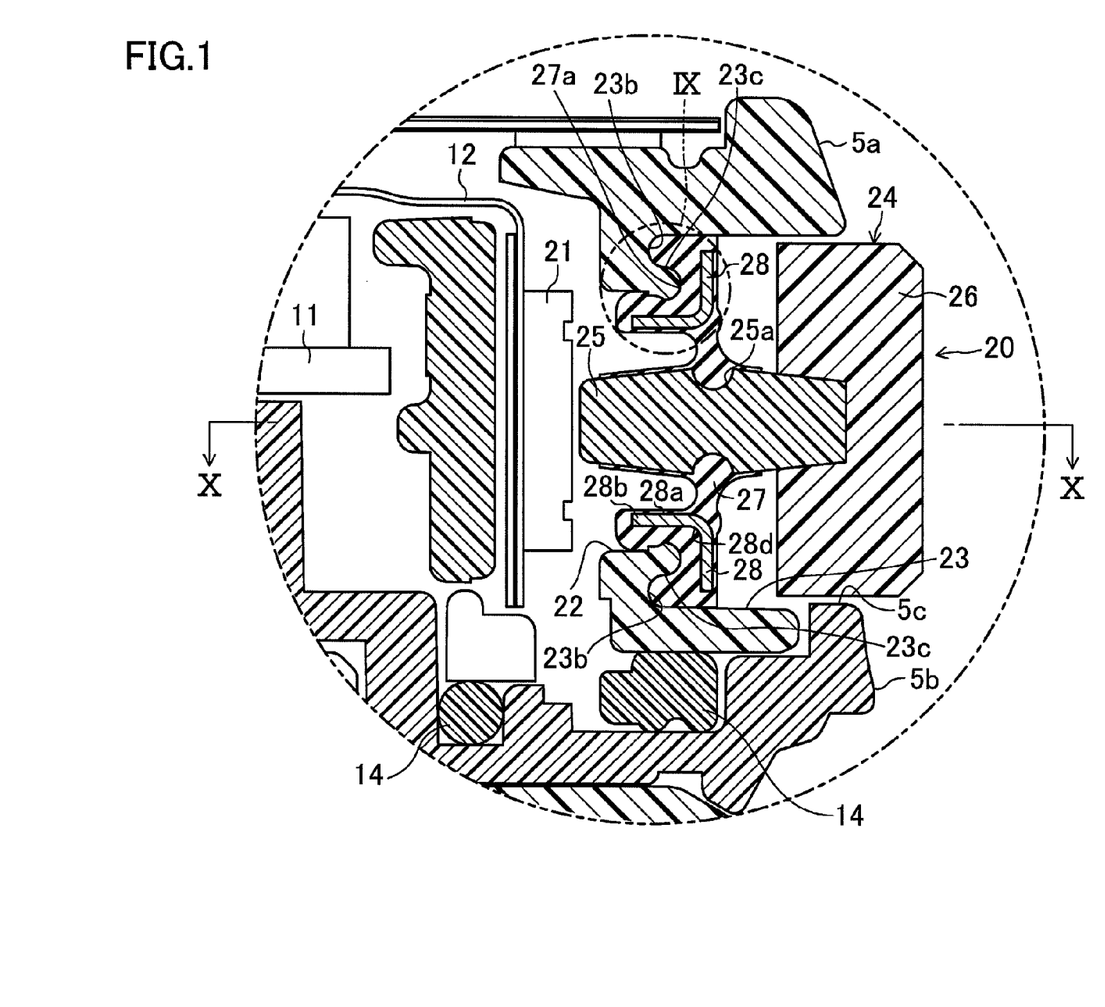
FIG. 1 is an enlarged cross section of a push-button switch structure and its surroundings.
Figure 10:
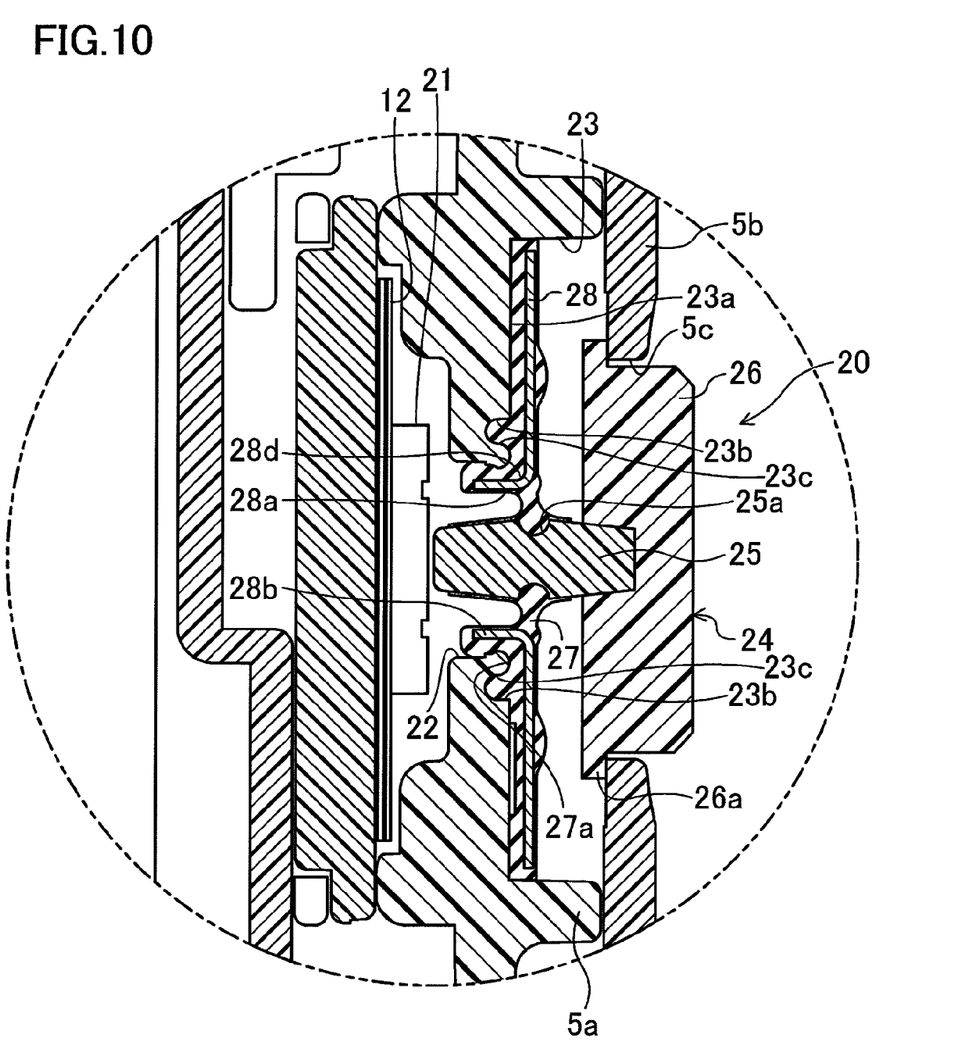
FIG. 10 is a cross section taken along the line X-X of FIG. 1.

As shown in the enlarged views of FIG. 1 and FIG. 10, the side key 20 includes a press switch 21 electrically connected to the flexible substrate 12. The press switch 21 is configured to turn on by being pushed at the center of its surface, and to turn off when it is not pushed. As can also be seen in FIG. 11, a circular switch through hole 22 is formed in the front cabinet 5a at a position facing the press switch 21. The periphery of the switch through hole 22 is recessed from the other area of the side surface of the front cabinet 5a, and a switch recess 23 having a generally rectangular bottom surface 23a when viewed from the side surface of the second casing 5 is formed. The switch through hole 22 is positioned at a generally central location of the switch recess 23. A switch assembly 24 which comprises the side key 20 is fitted in the switch recess 23.

Figure 4:
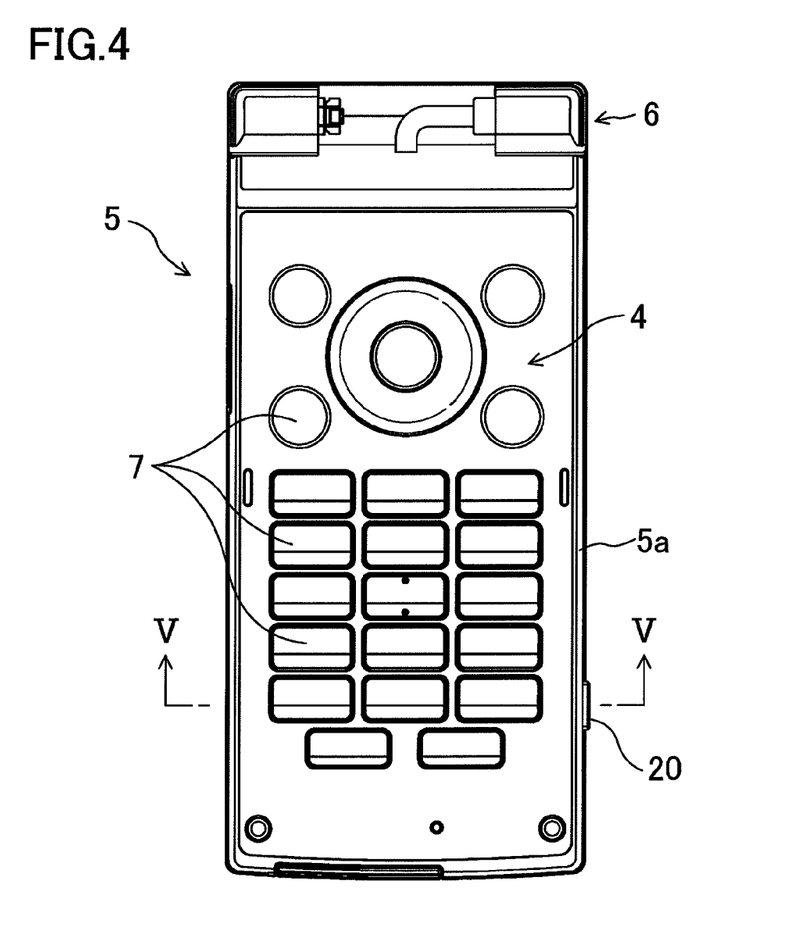
FIG. 4 is a front view of a second casing.
Figure 6:
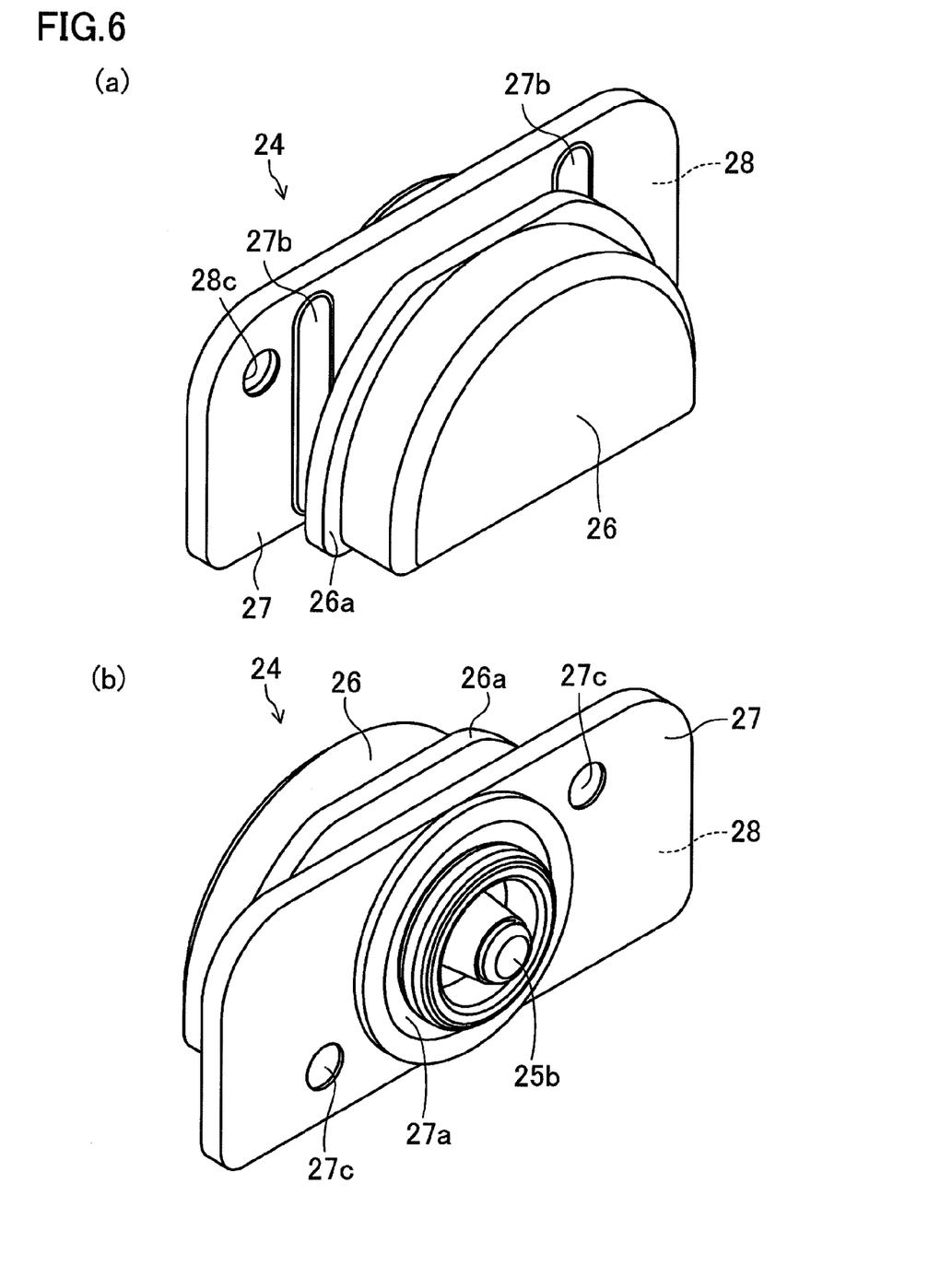
FIG. 6 is an enlarged oblique view of a switch assembly.
Figure 7:
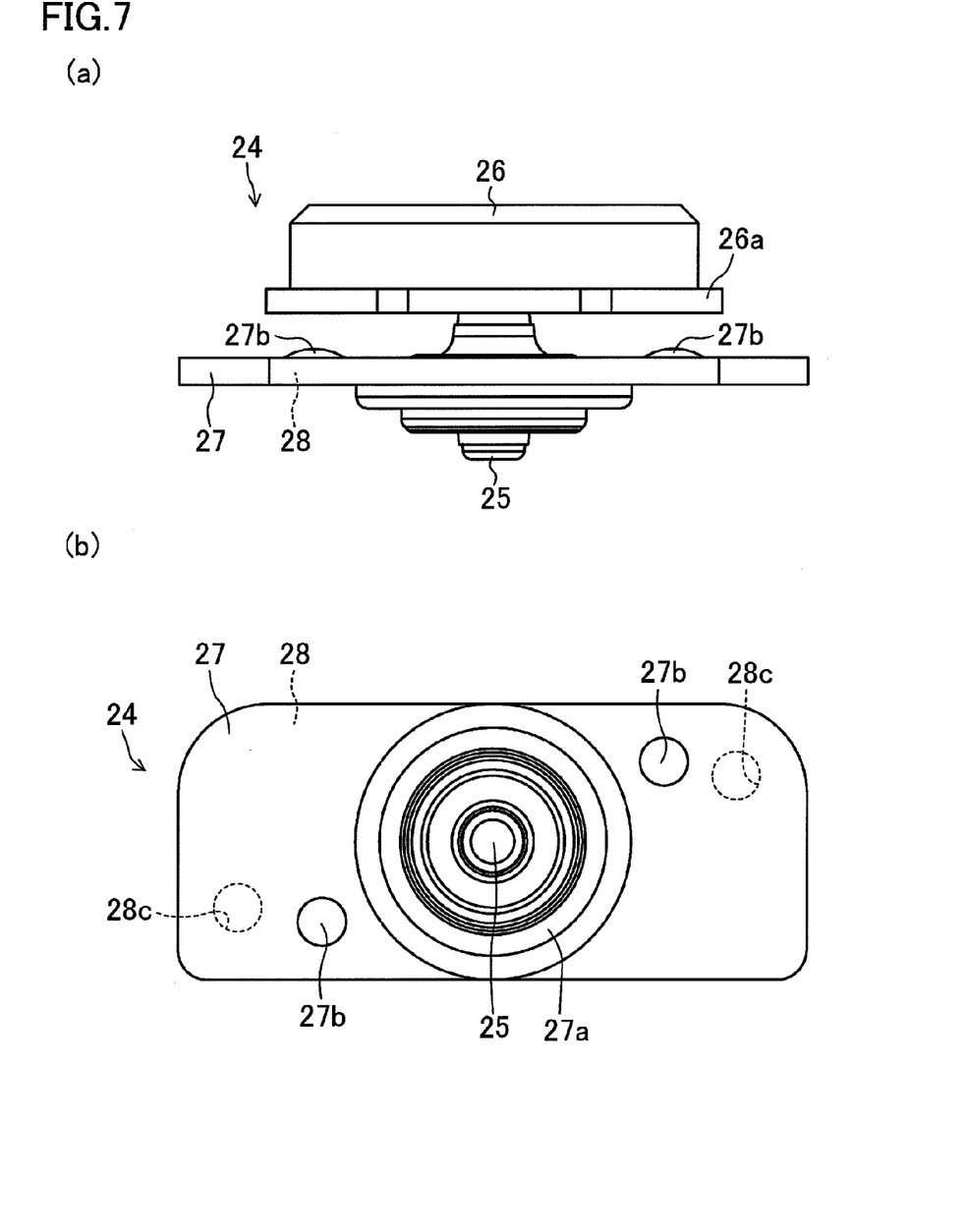
FIG. 7 is an enlarged view of a switch assembly.
Figure 8:
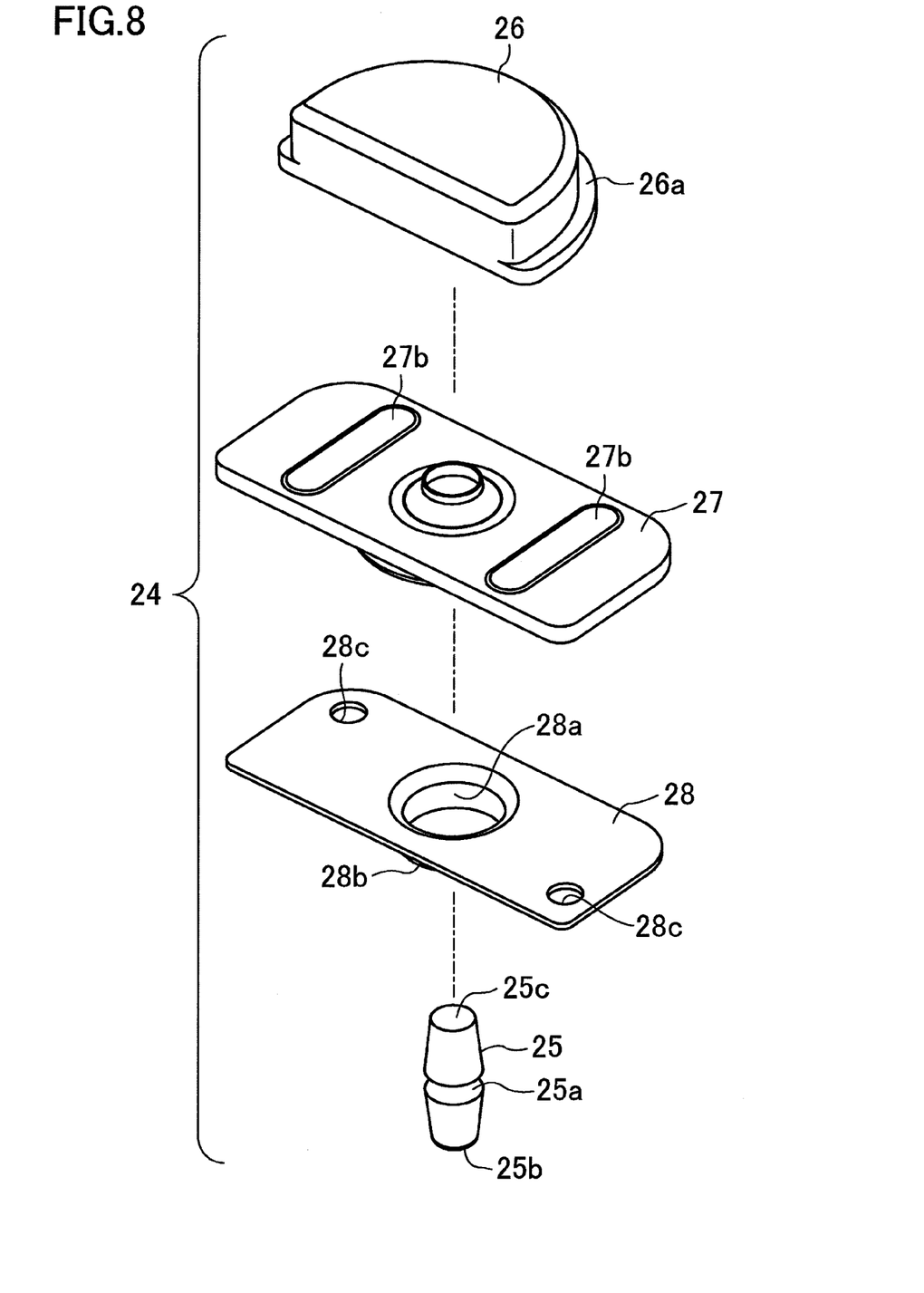
FIG. 8 is an exploded oblique view of an enlarged switch assembly.

As can also be seen in FIG. 6 to FIG. 8, the switch assembly 24 includes a pressing element 25, and one end of the pressing element 25 in the axial direction (i.e., the end on the left side in FIG. 4) presses the press switch 21. The pressing element 25 is made, for example, of bar-shaped polycarbonate (PC) having a circular cross section, and is tapered from its middle portion in the axial direction toward both ends. As shown in FIG. 1, a connecting recess 25a having an arc-shaped cross section is formed in the outer periphery of the middle portion of the pressing element 25 in the axial direction. A key top 26 is coupled to the other end of the pressing element 25 in the axial direction, by bonding, etc. The key top 26 is made, for example, of an aluminum alloy. The side surface of the front cabinet 5a on the side of the battery lid 10 (i.e., on the back surface side) is covered by the rear cabinet 5b, and the rear cabinet 5b has an external fitting through hole 5c at a position corresponding to the switch through hole 22. In order to improve operability while reducing the thickness of the second casing 5, the outer surface (i.e., the surface viewed from the side surface of the second casing 5) of the key top 26 is formed in a semicircular shape, and a flange 26a is formed in the periphery of the key top 26. The flange 26a contacts the backside periphery of the external fitting through hole 5c when the side surface of the front cabinet 5a is covered by the rear cabinet 5b. This prevents the key top 26 from being separated from the second casing 5, and improves appearance because only a portion of the key top 26 which is located outside the flange 26a is exposed from the second casing 5.

The connecting recess 25a of the pressing element 25 is filled with an integrally-molded silicone rubber 27 as an elastic member. The silicone rubber 27 has a substantially rectangular shape corresponding to the switch recess 23 in plan view, and a reinforcing plate 28 made of a stainless steel alloy (e.g., SUS 302) is embedded in the silicone rubber 27. The reinforcing plate 28 is a plate-like member having a substantially rectangular shape corresponding to the switch recess 23 in plan view. The reinforcing plate 28 has a plate through hole 28a in the center, for allowing the pressing element 25 to be inserted therethrough. The reinforcing plate 28 has an annular vertical wall portion 28b formed at the periphery of the plate through hole 28a, and bent toward the side of the press switch 21. The dimensions of the vertical wall portion 28b and the pressing element 25 are designed such that there is a predetermined gap between the inner periphery of the vertical wall portion 28b and the outer periphery of the pressing element 25. The reinforcing plate 28 has positioning holes 28c used when the reinforcing plate 28 is formed integrally with the silicone rubber 27. The reinforcing plate 28 is formed by pressing, for example, a stainless steel alloy. A portion of the pressing element 25 which faces the press switch 21 is not covered by the silicone rubber 27, so that the pressing element 25 directly presses the press switch 21. The silicone rubber 27 has a pair of protruding portions 27b on the surface facing the key top 26. Thus, when the key top 26 is pressed hard, the rear surface of the key top 26 contacts the pair of protruding portions 27b. Further, marks 27c are left on the surface of the silicone rubber 27 facing the press switch 21 by being pressed by retaining pins (not shown) provided to a lower mold during molding.

Figure 11:
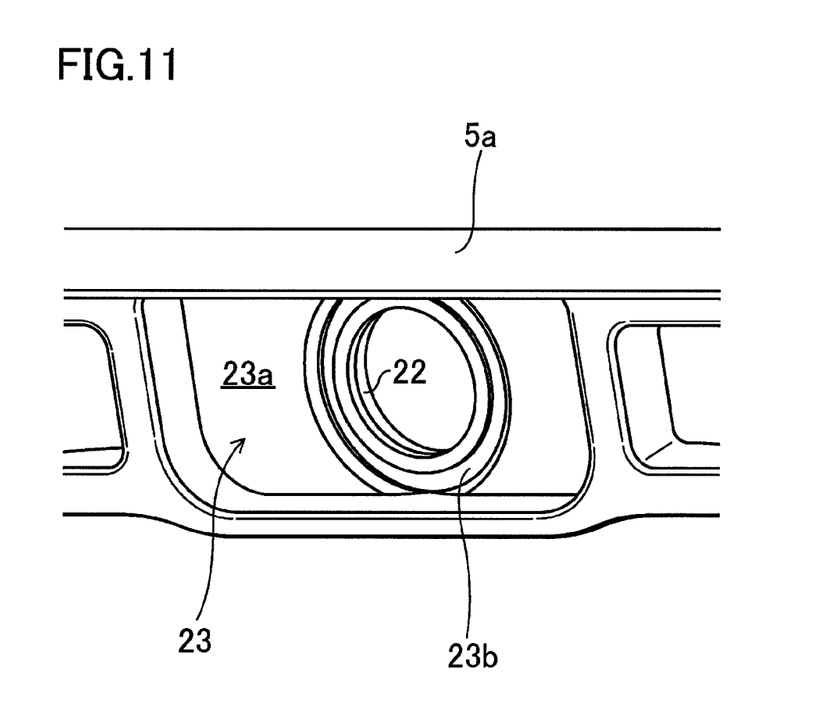
FIG. 11 is an enlarged oblique view of a switch through hole and its surroundings.

On the other hand, as shown in FIG. 1, FIG. 10 and FIG. 11, an elastic-member fitting recess 23b is formed on the bottom surface 23a of the switch recess 23 so as to surround the switch through hole 22. The elastic-member fitting recess 23b is a groove having an annular shape when viewed from the side surface of the second casing 5. As shown in enlarged view in FIG. 9, an elastic-member annular recess 27a is formed in the silicone rubber 27 at a position corresponding to the elastic-member fitting recess 23b, so as to cover an inside wall surface 23c of the elastic-member fitting recess 23b and an inner peripheral wall surface 22a of the switch through hole 22. When the switch assembly 24 is fitted in the switch recess 23, the elastic-member annular recess 27a of the silicone rubber 27 integrally molded on the back side of the reinforcing plate 28 is pressed against the inside wall surface 23c of the elastic-member fitting recess 23b and the inner peripheral wall surface 22a of the switch through hole 22, by a corner portion 28d formed by the vertical wall portion 28b and the periphery of the plate through hole 28a of the reinforcing plate 28. A latch recess 22b is formed in a portion of the inner peripheral wall surface 22a of the switch through hole 22 near the press switch 21 so as to be recessed with respect to a portion of the inner peripheral wall surface 22a near the key top 26. For example, the latch recess 22b is configured such that the entire inner peripheral wall surface 22a closer to the press switch 21 is recessed with respect to the inner peripheral wall surface 22a closer to the key top 26, thereby increasing the inner diameter of the switch through hole 22 closer to the press switch 21. Thus, the silicone rubber 27 pushed into the vertical wall portion 28b is latched by the latch recess 22b. The latch recess 22b thus provides the effect of preventing the silicone rubber 27 from being separated from the switch through hole 22. The latch recess 22*b* does not necessarily have to be a continuous recess, and recesses may be discretely formed.

—Assembly Method and Effects of Push-Button Switch Structure—

Now, a method for assembling the push-button switch structure according to the present embodiment and effects of the push-button switch structure will be described.

The switch assembly 24 is prepared by fitting the pressing element 25 and the reinforcing plate 28 into a molding die (not shown) beforehand, injecting the silicone rubber 27 so that the silicone rubber 27 is molded integrally with the pressing element 25 and the reinforcing plate 28, and adhering the key top 26 to the pressing element 25. The connecting recess 25*a* of the pressing element 25 increases the bonding area between the silicone rubber 27 and the pressing element 25, and improves dustproof and waterproof effects because the silicone rubber 27 is caught into the connecting recess 25*a* with reliability. Further, since the key top 26 and the pressing element 25 are separate members, the shapes of the key top 26 and the pressing element 25 are simpler, and thus the manufacturing time is reduced, compared to the case where the key top 26 and the pressing element 25 are a single-piece member, and the design can be easily changed by simply replacing the key top 26 with another member. In this structure, the pressing element 25, the silicone rubber 27, and the reinforcing plate 28 may be used as common components, and the key top 26 may be changed according to mobile phones 1, thereby making it possible to reduce the fabrication cost. Further, the reinforcing plate 28 embedded in the silicone rubber 27 can increase the durability of the silicone rubber 27 while preventing the deformation of the silicone rubber 27.

Next, the integrally-formed switch assembly 24 is fitted to the switch recess 23 of the front cabinet 5*a*. Since the pressing element 25 and the reinforcing plate 28 are integrally molded with the silicone rubber 27, the positioning of the switch assembly 24 and the switch recess 23 becomes easy. This increases ease of assembly, and the durability is increased because the silicone rubber 27 is connected to the pressing element 25 and the reinforcing plate 28 with reliability.

Figure 9:
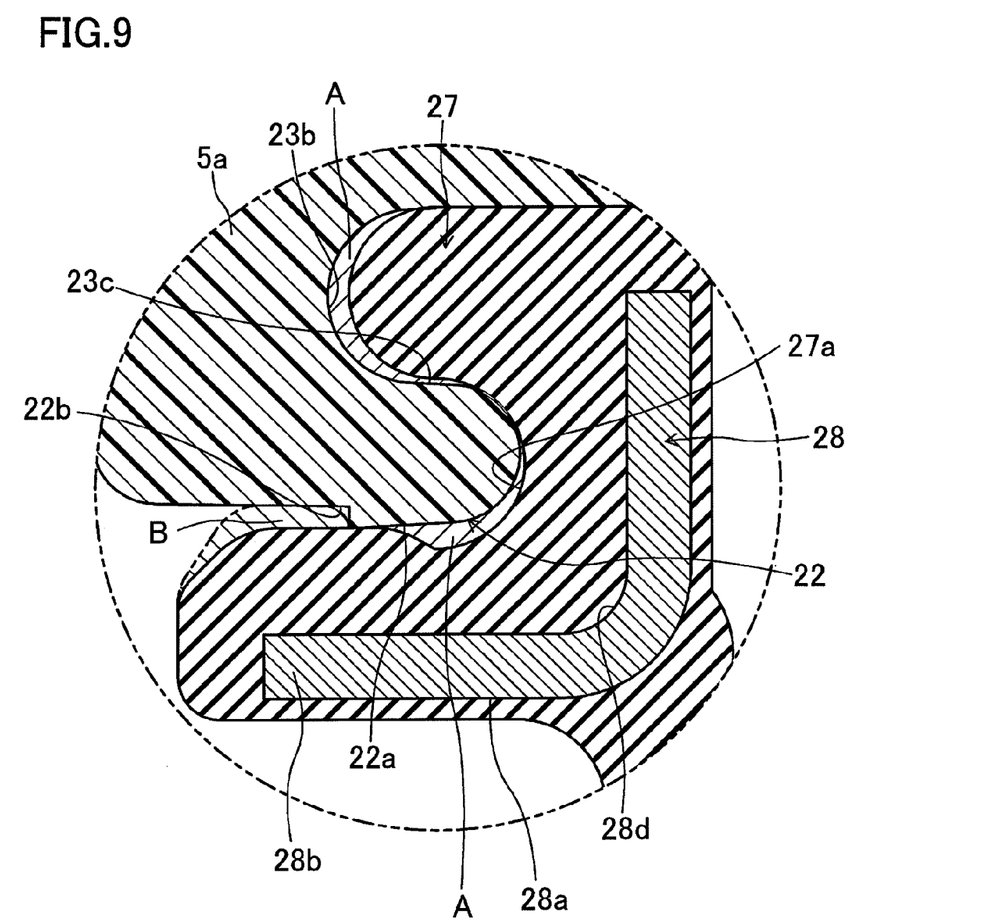
FIG. 9 is an enlarged cross section of a portion IX of FIG. 1.

Moreover, as shown in enlarged view in FIG. 9, when the switch assembly 24 is inserted into the switch through hole 22, the elastic-member annular recess 27*a* of the silicone rubber 27 is elastically deformed due to the reinforcing plate 28 embedded in the silicone rubber 27, and swells to the region A to cover the inside wall surface 23*c* of the elastic-member fitting recess 23*b* and the inner peripheral wall surface 22*a* of the switch through hole 22. As a result, the silicone rubber 27 comes into close contact with the switch through hole 22 with reliability, and thus, dustproof and waterproof effects are reliably increased. Further, the silicone rubber 27 is pushed by the reinforcing plate 28 to swell to the region B and is pushed into the latch recess 22*b*. Thus, the silicone rubber 27 is latched by the latch recess 22*b* with reliability, and the silicone rubber 27 is prevented from being separated from the switch through hole 22.

Next, the rear cabinet 5*b* is fitted to cover the front cabinet 5*a* from over the switch assembly 24. Thus, as shown in FIG. 10, the flange 26*a* of the key top 26 contacts the backside periphery of the external fitting through hole 5*c*. This prevents the key top 26 from being separated from the front cabinet 5*a*, and improves appearance because the rear cabinet 5*b* blocks the silicone rubber 27 from view.

In the thus assembled side key 20, a portion of the pressing element 25 which faces the press switch 21 is not covered by the silicone rubber 27. Therefore, it is possible to reduce the length of the pressing element 25 of the side key 20 in the axial direction thereof, and reduce the size of the mobile phone 1.

When the side key 20 is pressed to use, the silicone rubber 27 is not compressed but is bent because the silicone rubber 27 is connected to the outer periphery of the middle portion of the pressing element 25 in the axial direction. In this structure, the feel of pressing the pressing element 25 is not deteriorated even if the thickness of the portion at which the silicone rubber 27 is connected to the outer periphery of the middle portion of the pressing element 25 in the axial direction is increased. Thus, the durability of the silicone rubber 27 is increased and dustproof and waterproof effects are increased, while maintaining the appropriate feel of pressing.

Thus, according to the present embodiment, the durability of the side key 20 can be increased while increasing ease of assembly of the side key 20. With such a side key 20, the mobile phone 1 can be easily assembled and have great durability, and can be highly marketable.

Other Embodiments

The embodiment of the present invention may also have the following structures.

In the above embodiment, a portion of the pressing element 25 facing the press switch 21 is not covered by the silicone rubber 27, but the portion may be covered by the silicone rubber 27, and this silicone rubber 27 may press the press switch 21. In this case, the press switch 21 is not easily damaged because the silicone rubber 27 presses the press switch 21. As a result, durability can be increased.

In the above embodiment, the elastic member is the silicone rubber 27. However, the elastic member is not limited to the silicone rubber 27, but may be elastomer, rubber, etc., which can be injection molded.

In the above embodiment, the pressing element 25 is made of polycarbonate, but may be made of another resin or metal. The reinforcing plate 28 is made of a stainless steel alloy, but may be made of another metal or resin. Depending on the material, the pressing element and the reinforcing plate may not be integrally molded with an elastic member, but may be connected to the elastic member with an adhesive.

In the above embodiment, the electronic device is the mobile phone 1. However, the electronic device may be a personal handy-phone system (PHS), a personal digital assistant (PDA), a personal computer, a mobile tool, an electronic dictionary, an electronic calculator, a game machine, a clock, etc. The electronic device does not necessarily have to have a waterproof function. According to the present invention, the electronic device is superior in ease of assembly and a dustproof effect.

The foregoing embodiments are merely preferred examples in nature, and are not intended to limit the scope, applications, and use of the invention.

INDUSTRIAL APPLICABILITY

As described above, the present invention is useful as a push-button switch structure used in an electronic device such as a mobile phone.

DESCRIPTION OF REFERENCE CHARACTERS

1 mobile phone (electronic device)
5*a* front cabinet (electronic device body)
5*b* rear cabinet (external cover)
5*c* external fitting through hole 20 side key (push-button switch structure)
21 press switch
22 switch through hole
23 switch recess
23a bottom surface
23b elastic-member fitting recess
23c inside wall surface
25 pressing element
25a connecting recess
26 key top
26a flange
27 silicone rubber (elastic member)
27a elastic-member annular recess
28 reinforcing plate
28a plate through hole
28b vertical wall portion
28d corner portion

The invention claimed is:

1. A push-button switch structure of an electronic device, comprising:
a switch through hole formed in an electronic device body;
a press switch located in the electronic device body to correspond to the switch through hole;
a pressing element having a first end in an axial direction that presses the press switch;
a key top coupled to a second end of the pressing element in the axial direction, and exposed from the switch through hole;
a reinforcing plate having a plate through hole in which the pressing element is inserted; and
an elastic member which covers the reinforcing plate and which is fitted to a periphery of the switch through hole, while connecting the pressing element and the reinforcing plate by filling a gap between an outer periphery of a middle portion of the pressing element in the axial direction and the plate through hole, wherein
a switch recess to which the elastic member is fitted is formed at the periphery of the switch through hole,
an elastic-member fitting recess which surrounds the switch through hole is formed in a bottom surface of the switch recess, and
an elastic-member annular recess is formed in the elastic member at a position corresponding to the elastic-member fitting recess, so as to cover an inside wall surface of the elastic-member fitting recess and an inner peripheral wall surface of the switch through hole.

2. The push-button switch structure of claim 1, wherein
the reinforcing plate has an annular vertical wall portion formed at a periphery of the plate through hole and bent toward the press switch, and
the elastic-member annular recess is pressed against the inside wall surface of the elastic-member fitting recess and the inner peripheral wall surface of the switch through hole by a corner portion formed by the vertical wall portion and the periphery of the plate through hole.

3. The push-button switch structure of claim 2, wherein
a latch recess is formed in a portion of the inner peripheral wall surface of the switch through hole near the press switch so as to be recessed with respect to a portion of the inner peripheral wall surface of the switch through hole near the key top.

4. The push-button switch structure of claim 1, wherein
a connecting recess is formed in the outer periphery of the middle portion of the pressing element in the axial direction, and the connecting recess is filled with the elastic member.

5. The push-button switch structure of claim 1, wherein
the pressing element and the reinforcing plate are integrally molded with the elastic member.

6. The push-button switch structure of claim 1, wherein
the first end of the pressing element in the axial direction is not covered by the elastic member, and the press switch is pressed directly by the pressing element.

7. The push-button switch structure of claim 1, wherein
the first end of the pressing element in the axial direction is covered by the elastic member, and the press switch is pressed by the elastic member.

8. The push-button switch structure of claim 1, wherein
at least part of the electronic device body is covered by an external cover which has an external fitting through hole at a position corresponding to the switch through hole of the electronic device body, and
the key top has a flange which contacts a backside periphery of the external fitting through hole.

9. An electronic device comprising the push-button switch structure of claim 1.

* * * * *